(12) United States Patent
Lee et al.

(10) Patent No.: US 12,355,870 B2
(45) Date of Patent: Jul. 8, 2025

(54) NETWORK APPARATUS FOR QUANTUM KEY DISTRIBUTION, AND OPERATION METHOD FOR QUANTUM KEY DISTRIBUTION NETWORK

(71) Applicant: KOREA INSTITUTE OF SCIENCE & TECHNOLOGY INFORMATION, Daejeon (KR)

(72) Inventors: Chan Kyun Lee, Daejeon (KR); Yong Hwan Kim, Daejeon (KR); Kyu Seok Shim, Daejeon (KR); Won Hyuk Lee, Sejong-si (KR)

(73) Assignee: KOREA INSTITUTE OF SCIENCE & TECHNOLOGY INFORMATION, Daejeon (KR)

( * ) Notice: Subject to any disclaimer, the term of this patent is extended or adjusted under 35 U.S.C. 154(b) by 164 days.

(21) Appl. No.: 17/952,457

(22) Filed: Sep. 26, 2022

(65) Prior Publication Data
US 2024/0007277 A1 Jan. 4, 2024

(30) Foreign Application Priority Data
May 30, 2022 (KR) .................. 10-2022-0066032

(51) Int. Cl.
*H04L 9/08* (2006.01)
*H04L 9/14* (2006.01)
(52) U.S. Cl.
CPC .......... *H04L 9/0855* (2013.01); *H04L 9/0894* (2013.01); *H04L 9/14* (2013.01)

(58) Field of Classification Search
CPC ..... H04L 9/08; H04L 9/12; H04L 9/14; H04L 9/0618; H04L 9/0819; H04L 9/0827; H04L 9/0833; H04L 9/0852; H04L 9/0855; H04L 9/0858; H04L 9/0861; H04L 9/0863; H04L 9/0869; H04L 9/0894; H04L 45/00; H04W 40/00; H04B 10/00; H04B 10/50;
(Continued)

(56) References Cited

U.S. PATENT DOCUMENTS 12,019,511 B2 * 6/2024 Hashimoto ............... H04L 9/30
2004/0184603 A1 * 9/2004 Pearson ................ H04L 9/0855
380/28

(Continued)

FOREIGN PATENT DOCUMENTS

| CN | 103001875 | 3/2013 |
| CN | 109962774 | 7/2019 |

(Continued)

OTHER PUBLICATIONS

Chuang, Isaac L., and Yoshihisa Yamamoto. "Quantum bit regeneration." Physical review letters 76.22 (1996): 4281. (Year: 1996).*
(Continued)

*Primary Examiner* — James N Fiorillo
(74) *Attorney, Agent, or Firm* — KED & ASSOCIATES, LLP

(57) ABSTRACT

The present disclosure relates to a quantum key distribution network apparatus and an operation method for a quantum key distribution network, for independently operating a data transfer path and a quantum key consumption path on which a quantum key is consumed to encrypt corresponding data in a quantum key distribution network.

9 Claims, 4 Drawing Sheets

(58) Field of Classification Search
CPC ......... H04B 10/66; H04B 10/70; H04J 14/02; H04J 14/03; G06N 10/00; G06F 11/076; G06F 11/0709
USPC .......................................................... 713/171
See application file for complete search history.

(56) References Cited

U.S. PATENT DOCUMENTS

| | | | | |
|---|---|---|---|---|
| 2007/0212063 | A1* | 9/2007 | Meli | H04J 14/0227 398/30 |
| 2009/0016736 | A1* | 1/2009 | Beal | H04L 9/0852 398/144 |
| 2010/0299526 | A1* | 11/2010 | Wiseman | H04L 63/061 713/171 |
| 2011/0064222 | A1* | 3/2011 | Wiseman | H04L 9/0827 380/278 |
| 2011/0317836 | A1* | 12/2011 | Yeh | H04L 9/0855 380/255 |
| 2012/0177201 | A1* | 7/2012 | Ayling | H04L 9/0858 380/278 |
| 2016/0197723 | A1* | 7/2016 | Takahashi | G06F 11/0709 380/255 |
| 2017/0214525 | A1* | 7/2017 | Zhao | H04W 12/0431 |
| 2019/0260581 | A1* | 8/2019 | Su | H04L 9/08 |
| 2021/0044432 | A1* | 2/2021 | Li | H04L 9/0852 |
| 2021/0119788 | A1* | 4/2021 | Wang | H04B 10/272 |
| 2021/0175977 | A1* | 6/2021 | Cavaliere | H04J 14/0267 |
| 2022/0006627 | A1* | 1/2022 | Ko | H04L 9/0852 |
| 2024/0031139 | A1* | 1/2024 | Vinokur | H04L 9/0855 |

FOREIGN PATENT DOCUMENTS

| | | |
|---|---|---|
| CN | 111355655 | 6/2020 |
| EP | 3243295 | 11/2017 |
| JP | 2003-244123 | 8/2003 |
| JP | 2008-306633 | 12/2008 |
| JP | 2010-286978 | 12/2010 |
| JP | 2013-544479 | 12/2013 |
| JP | 2018-502514 | 1/2018 |
| JP | 2020-501413 | 1/2020 |
| KR | 10-2327941 | 11/2021 |
| WO | WO 2021/025749 | 2/2021 |
| WO | WO 2021/054693 | 3/2021 |
| WO | WO-2023194717 A1 * 10/2023 ............. H04B 10/70 |

OTHER PUBLICATIONS

Chuang, Isaac L, and Yoshihisa Yamamoto, "Quantum bit regeneration" Physical review letters 76.22 4281 (Year: 1996).*
European Search Report dated May 24, 2023 issued in Application No. 22200525.8.
Japanese Office Action dated Dec. 26, 2023 issued in Application No. 2022-168740.
Korean Office Action dated Sep. 12, 2024 issued in Application No. 10-2022-0066032.

* cited by examiner

<Quantum key distribution network apparatus>

NETWORK APPARATUS FOR QUANTUM KEY DISTRIBUTION, AND OPERATION METHOD FOR QUANTUM KEY DISTRIBUTION NETWORK

CROSS-REFERENCE TO RELATED APPLICATION(S)

This application is based on and claims priority under 35 U.S.C. 119 to Korean Patent Application No. 10-2022-0066032, filed on May 30, 2022, in the Korean Intellectual Property Office, the disclosure of which is herein incorporated by reference in its entirety.

BACKGROUND OF THE INVENTION

1. Field of the Invention

The present disclosure relates to a method for independently operating a data transfer path and a quantum key consumption path on which a quantum key is consumed to encrypt corresponding data in a quantum key distribution network.

2. Description of the Prior Art

A quantum key distribution (QKD) encryption technique is a representative network security technique enabling a quantum encryption communication that is an encryption communication system using physical properties of quantum. Through this technique, a transmitter and a receiver can share a key to encrypt or decrypt data in a scheme of sharing quantum bits (qubits).

In a quantum key distribution network employing this quantum key distribution encryption technique, even though an optimal path for data transfer and an optimal path for quantum key resource may be different, a quantum key on the same path as a data transfer path on which data is transferred may be consumed to encrypt corresponding data.

However, as described above, in a case where a quantum key consumption path on which a quantum key is consumed coincides with a data transfer path in a quantum key distribution network, dependence thereof may cause deterioration of network performance, and there is a danger that data and a quantum key may be both exposed when the corresponding path is eavesdropped.

SUMMARY OF THE INVENTION

The present disclosure has been made to solve the above problem, and an aspect to achieve in the present disclosure is to independently operate a data transfer path and a quantum key consumption path on which a quantum key is consumed to encrypt corresponding data in a quantum key distribution network.

In accordance with the above aspect, a quantum key distribution network apparatus according to an embodiment of the present disclosure includes: a quantum key receiver configured to receive a quantum key distributed between a pair of adjacent nodes in a quantum key distribution network; and a quantum key combiner configured to combine quantum keys, among quantum keys distributed between pairs of adjacent nodes, in a path connecting a pair of random nodes to regenerate a quantum key between the pair of random nodes.

Specifically, the quantum key combiner may be configured to, when the number of quantum keys allocated between the pair of random nodes is equal to or smaller than a pre-configured first threshold, regenerate a quantum key between the pair of random nodes.

Specifically, the quantum key combiner may be configured to, when the number of link paths connecting the pair of random nodes is calculated to be two or more, combine quantum keys in a particular link path, among the two or more link paths, in which a link has the largest minimum number of quantum keys, so as to regenerate a quantum key.

Specifically, the quantum key combiner may be configured to, when there are two or more link paths connecting the pair of random nodes, calculate link paths, the number of which is equal to or smaller than a pre-configured second threshold.

Specifically, the quantum key distribution network apparatus may further include a quantum key information storage unit configured to, when a quantum key between the pair of random nodes is regenerated, store information of at least one of a quantum key consumption path in which a quantum key has been consumed for the regeneration of the quantum key, and a time at which the quantum key is regenerated, wherein the quantum key information storage unit is configured to discard a quantum key not used until passage of a time of a pre-configured third threshold or longer from a regeneration time point.

Specifically, the quantum key distribution network apparatus may further include a data transmitter configured to, when data transmission between the pair of random nodes is required, transmit encrypted data through a data transmission path, at least a partial path of which does not overlap with a quantum key consumption path in which a quantum key has been consumed for regeneration of a quantum key, among link paths connecting the pair of random nodes.

Specifically, the data transmitter may be configured to calculate, as the data transmission path, a link path, among link paths connecting the pair of random nodes, which is a disjoint set for the quantum key consumption path.

Specifically, the data transmitter may be configured to, when the data transfer path is calculated, exceptionally allowing overlapping of links in the quantum key consumption path, the number of which is equal to or smaller than a pre-configured fourth threshold.

The data transmitter may be configured to calculate, as the data transmission path, a node path, among node paths connecting the pair of random nodes, which is a disjoint set for the quantum key consumption path.

Specifically, the data transmitter may be configured to, when the data transfer path is calculated, exceptionally allowing overlapping of nodes in the quantum key consumption path, the number of which is equal to or smaller than a pre-configured fifth threshold.

In accordance with the above aspect, an operation method for a quantum key distribution network, which is performed in a quantum key distribution network apparatus, according to an embodiment of the present disclosure includes: a quantum key reception operation of receiving a quantum key distributed between a pair of adjacent nodes in a quantum key distribution network; and a quantum key combination operation of combining quantum keys, among quantum keys distributed between pairs of adjacent nodes, in a path connecting a pair of random nodes to regenerate a quantum key between the pair of random nodes.

Specifically, the quantum key combination operation may include regenerating a quantum key between the pair of random nodes when the number of quantum keys allocated between the pair of random nodes is equal to or smaller than a pre-configured first threshold.

Specifically, the quantum key combination operation may include, when the number of link paths connecting the pair of random nodes is calculated to be two or more, combining quantum keys in a particular link path, among the two or more link paths, in which a link has the largest minimum number of quantum keys, so as to regenerate a quantum key.

Specifically, the quantum key combination operation may include, when there are two or more link paths connecting the pair of random nodes, calculating link paths, the number of which is equal to or smaller than a pre-configured second threshold.

Specifically, the method may further include a quantum key information storage operation of, when a quantum key between the pair of random nodes is regenerated, storing information of at least one of a quantum key consumption path in which a quantum key has been consumed for the regeneration of the quantum key, and a time at which the quantum key is regenerated, wherein the quantum key information storage operation includes discarding a quantum key not used until passage of a time of a pre-configured third threshold or longer from a regeneration time point.

Specifically, the method may further include a data transmission operation of, when data transmission between the pair of random nodes is required, transmitting encrypted data through a data transmission path, at least a partial path of which does not overlap with a quantum key consumption path in which a quantum key has been consumed for regeneration of a quantum key, among link paths connecting the pair of random nodes.

Specifically, the data transmission operation may include calculating, as the data transmission path, a link path, among link paths connecting the pair of random nodes, which is a disjoint set for the quantum key consumption path.

Specifically, the data transmission operation may include, when the data transfer path is calculated, exceptionally allowing overlapping of links in the quantum key consumption path, the number of which is equal to or smaller than a pre-configured fourth threshold.

The data transmission operation may include calculating, as the data transmission path, a node path, among node paths connecting the pair of random nodes, which is a disjoint set for the quantum key consumption path.

Specifically, the data transmission operation may include, when the data transfer path is calculated, exceptionally allowing overlapping of nodes in the quantum key consumption path, the number of which is equal to or smaller than a pre-configured fifth threshold.

Therefore, in a quantum key distribution network apparatus, and an operation method for a quantum key distribution network according to the present disclosure, independent configurations of a quantum key consumption path and a data transfer path enable configuration of optimal paths suitable for respective purposes, whereby improvement of network performance in quantum encryption communication can be accomplished. Moreover, network sharing between a quantum key consumption path and a data transfer path may be minimized to reduce the risk of exposure of both a quantum key and data even with existence of an eavesdropper, whereby security improvement effects can be expected.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, preferred embodiments of the present disclosure will be described with reference to the accompanying drawings.

An embodiment of the present disclosure deals with a quantum key distribution (QKD) encryption technique that is an encryption system using physical properties of quantum.

The quantum key distribution encryption technique is a representative network security technique enabling a quantum encryption communication that is an encryption communication system using physical properties of quantum. Through this technique, a transmitter and a receiver can share a key to encrypt or decrypt data in a scheme of sharing quantum bits (qubits).

Figure 1:
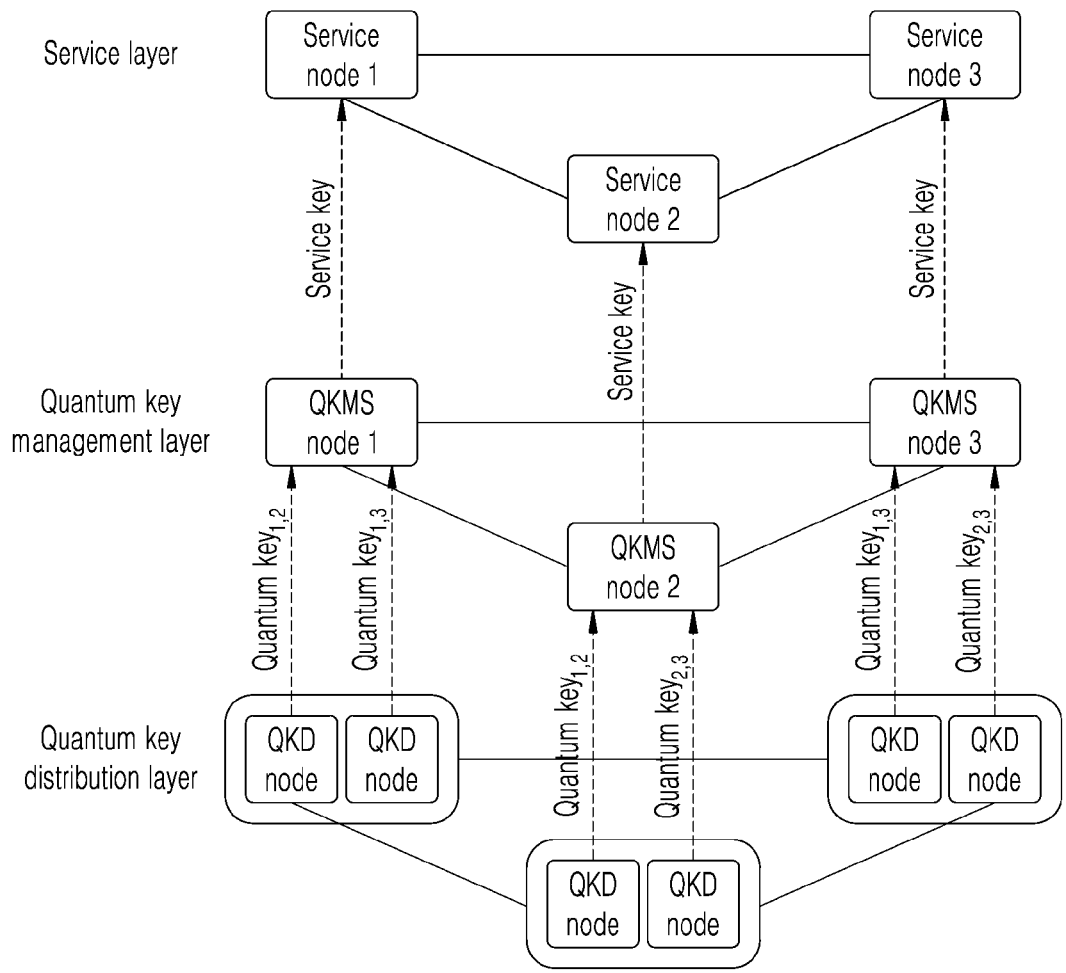
FIG. 1 illustrates an example of a quantum key distribution network structure according to an embodiment of the present disclosure.

A quantum key distribution network employing this quantum key distribution encryption technique has, for example, a hierarchical structure as shown in FIG. 1, so as to accomplish efficiency and economy.

That is, a quantum key distribution network may include a quantum key distribution layer configured to generate a quantum key and share same between a pair of quantum key distribution nodes (QKD nodes), a quantum key management layer configured to store, combine, and regenerate a received quantum key, and a service layer configured to apply a quantum key to a network service as a service key.

In this quantum key distribution network, even though an optimal path for data transfer and an optimal path for quantum key resource may be different, a quantum key on the same path as a data transfer path on which data is transferred may be consumed to encrypt corresponding data.

That is, when data generated in node 1 is transferred to node 3 via node 2, the corresponding data may be encrypted by consuming a quantum key1,2 between node 1 and node 2 and a quantum key2,3 between node 2 and node 3, and then be transmitted.

However, as described above, in a case where a quantum key consumption path on which a quantum key is consumed coincides with a data transfer path in a quantum key distribution network, dependence thereof may cause deterioration of network performance, and there is a danger that data and a quantum key may be both exposed when the corresponding path is eavesdropped.

Therefore, an embodiment of the present disclosure proposes a method for independently operating a data transfer path and a quantum key consumption path on which a quantum key is consumed to encrypt corresponding data in a quantum key distribution network. Hereinafter, a configuration of a quantum key distribution network apparatus for implementing the method will be described in detail.

Figure 2:
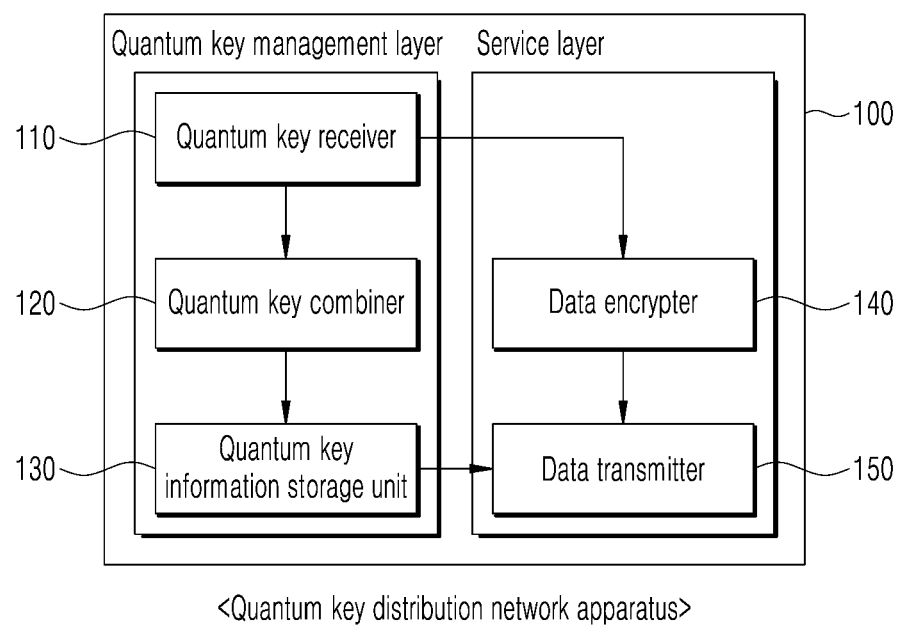
FIG. 2 is a block diagram illustrating a configuration of a quantum key distribution network apparatus according to an embodiment of the present disclosure.

In relation thereto, FIG. 2 shows a configuration of a quantum key distribution network apparatus 100 according to an embodiment of the present disclosure.

As illustrated in FIG. 2, the quantum key distribution network apparatus 100 according to an embodiment of the present disclosure may have a configuration including a quantum key receiver 110 configured to receive a quantum key, and a quantum key combiner 120 configured to combine quantum keys.

In addition, the quantum key distribution network apparatus 100 according to an embodiment of the present disclosure may have a configuration further including, in addition to the above configuration, a quantum key information storage unit 130 configured to store information relating to regeneration of a quantum key, a data encrypter 140 configured to encrypt data, and a data transmitter 150 configured to transmit data.

The quantum key receiver 110, the quantum key combiner 120, and the quantum key information storage unit 130 are positioned in a quantum key management layer configured to store, combine, and regenerate a quantum key received from a quantum key distribution layer, and the data encrypter 140 and the data transmitter 150 are positioned in a service layer configured to apply a quantum key to a network service as a service key.

The entire configuration or at least partial configuration of the quantum key distribution network apparatus 100 including the quantum key receiver 110, the quantum key combiner 120, the quantum key information storage unit 130, the data encrypter 140, and the data transmitter 150 described above may be implemented in a hardware module type or software module type, or may be implemented in a type in which a hardware module and a software module are combined.

The software module may be understood as, for example, an instruction executed by a processor controlling calculation in the quantum key distribution network apparatus 100, and this instruction may be a type of being embedded in a memory in the quantum key distribution network apparatus 100.

In addition, the quantum key distribution network apparatus 100 described above basically corresponds to a separate controller (e.g., Q controller) configured to manage and control a quantum key management system node positioned in a quantum key management network layer, but is not limited thereto. The apparatus may also be correspond to a master node designated as one of nodes positioned in a quantum key distribution network, or correspond to each node positioned in a quantum key distribution network.

As described above, the quantum key distribution network apparatus 100 according to an embodiment of the present disclosure may independently operate, through the above configuration, a data transfer path and a quantum key consumption path on which a quantum key is consumed to encrypt corresponding data in a quantum key distribution network. Hereinafter, a more detailed description for each element in the quantum key distribution network apparatus 100 for implementing the operation will be provided.

The quantum key receiver 110 serves a function of receiving a quantum key.

More specifically, the quantum key receiver 110 may be configured to receive a quantum key distributed between a pair of adjacent nodes in a quantum key distribution network.

The quantum key receiver 110 may receive a quantum key that is distributed between a pair of adjacent nodes from the quantum key distribution layer configured to generate a quantum key and share same between a pair of quantum key distribution nodes (QKD nodes).

The quantum key combiner 120 serves a function of combining quantum keys.

More specifically, the quantum key combiner 120 may be configured to regenerate a quantum key in a scheme of combining quantum keys received from the quantum key distribution layer, when a particular condition is satisfied.

The particular condition may be irrelevant to data generation, and the combination of quantum keys may be understood as a process of consuming multiple quantum keys to regenerate one quantum key.

In the structure given above as an example in FIG. 1, in a case where combination of quantum keys is applied, a quantumkey1,3 may be generated by combining a quantum key1,2 and a quantum key2,3.

In relation thereto, the quantum key combiner 120 may be configured to combine quantum keys, among quantum keys distributed between pairs of adjacent nodes, in a link path connecting a pair of random nodes so as to regenerate a quantum key between the pair of random nodes.

When the number (ki,j) of quantum keys of a pair of random nodes (i, j ∈ N) among quantum keys stored in the quantum key management layer with respect to a network node set N is equal to or smaller than a first threshold (Thr1) configured by a user, the quantum key combiner 120 may combine quantum keys in the quantum key management layer to regenerate a quantum key for the corresponding pair of nodes (i,j).

The first threshold is possible to be flexibly configured according to each of a network environment and a user data generation pattern.

For the regeneration of a quantum key, as described above, a method of combining multiple quantum keys sharing a network node may be considered.

For example, a quantumkeya,b between node a and node b, and a quantum keyb,c between node b and node c may be consumed to regenerate a quantum keya,c between node a and node c.

That is, the regeneration of a quantum key for the pair of nodes (i,j) may be accomplished by combining quantum keys in a path pij that is a set of links connecting node i and node j in a network topology.

In a general network topology, there may be multiple paths connecting two random nodes.

Therefore, the quantum key combiner 120 is configured to calculate and store the total number of link paths connecting the pair of nodes (i,j) by a second threshold (Thr2).

When the second threshold becomes greater, more link paths are searched for. Therefore, it may be advantageous for selection of an optimal path, but a very long calculation time is required when a network scale gets larger.

Therefore, the second threshold may be flexibly selected according to a network scale and a computing performance.

In an embodiment of the present disclosure, a m-th path connecting the pair of nodes (i,j) is defined as pij(m).

In relation thereto, the quantum key combiner 120 may be configured to calculate an optimal quantum key consumption path through [Equation 1] below, and define a result of the calculation as pij*.

$$\underset{m}{\mathrm{argmax}}[\mathrm{MIN}(p_{ij}(m))] \qquad \text{[Equation 1]}$$

Here, MIN(pij(m)) indicates a minimum value of the number of quantum keys of links configuring pij(m), and thus a path having the largest minimum number of quantum keys among link paths connecting the pair of nodes (i,j) may be selected.

In short, as described above, the quantum key combiner (120) may be configured to combine (consume) quantum keys of pij* in which a link has the largest minimum number of quantum keys, among link paths connecting the pair of nodes (i,j), to regenerate a quantum key between the pair of nodes (i,j).

In an embodiment of the present disclosure, a quantum key consumption path has been described through [Equation 1] above, but is not limited thereto, and various quantum key resource-related elements may be used to calculate an optimal quantum key consumption path.

The quantum key information storage unit 130 may be configured to, when a quantum key between the pair of nodes (i,j) is regenerated, update and store pij* path information (quantum key consumption path) and information of a time at which the quantum key is regenerated, in a table R in which information of regenerated quantum keys is stored.

For reference, the quantum key information storage unit 130 may be configured to configure a third threshold (Thr3) for a life cycle of a quantum key and discard a quantum key which has not been used for a time longer than a life cycle, so as to support security improvement.

The third threshold may also be flexibly configured in consideration of a quantum key generation speed, a quantum key consumption speed, and a recommended value to satisfy the security criteria.

The data encrypter 140 serves a function of encrypting data.

More specifically, the data encrypter 140 may be configured to, when data transmission between a pair of random nodes is required, select a quantum key between the pair of random nodes as a service key and encrypt data.

When a request of data transmission between the pair of random nodes (i,j) occurs, the data encrypter 140 may request a service key for encryption of corresponding data from the quantum key management layer.

In relation thereto, the quantum key management layer selects the earliest generated quantum key (qi,j) among quantum keys for the corresponding pair of nodes and provides same as a service key, and the service layer encrypts data by using the quantum key.

The data transmitter 150 serves a function of transmitting encrypted data.

More specifically, the data transmitter 150 is configured to transmit, according to a request of data transmission between a pair of random nodes, encrypted data through a data transmission path, at least a partial path of which does not overlap with a quantum key consumption path in which a quantum key has been consumed for regeneration of a quantum key, among link paths connecting the pair of random nodes.

In relation thereto, a quantum key qi,j, which is selected as a service key for data encryption in the above example, may be a quantum key directly generated in the quantum key distribution layer, or may be a quantum key regenerated in the quantum key management layer.

The data transmitter 150 may be configured to, if the quantum key qi,j, which is selected as a service key, is a quantum key directly generated in the quantum key distribution layer, transfer encrypted data through a routing algorithm.

To this end, a routing algorithm, such as an open-shortest path first (OSPF), may be applied, but an embodiment of the present disclosure is not limited thereto.

The data transmitter 150 may be configured to, if the quantum key qi,j, which is selected as a service key, is a quantum key regenerated in the quantum key management layer, calculate a path, as a data transfer path, which is a disjoint set for a quantum key consumption path.

To this end, the data transmitter 150 may be configured to acquire path information (quantum key consumption path) on a quantum key which has been consumed for regeneration of qi,j, with reference to a regenerated quantum key information table R.

Furthermore, the data transmitter 150 is configured to exclude a quantum key consumption path for encryption of corresponding data from a network topology, and then calculate a data transmission path for transmission of the encrypted data through a routing algorithm.

For example, when quantum keys of link (i,n), link (n,m), and link (m,j) are consumed to regenerate a quantum key between a pair of random nodes (i,j), link (i,n), link (n,m), and link (m,j) may be stored for the regenerated quantum key (i,j) as information relating to a quantum key consumption path. In the above example, link (i,n) may be defined as a physical link connecting node i and neighboring node n.

When data using quantum key (i,j) occurs, the data may be transferred through a routing algorithm in a network topology excluding link (i,n), link (n,m), and link (m,j) with reference to a quantum key consumption path.

In addition, the data transmitter 150 may be configured to, when excluding a quantum key consumption path for corresponding data from a network topology, calculate a data transmission path for transmission of the encrypted data through a routing algorithm by using network node information.

For example, when quantum keys of link (i,n), link (n,m), and link (m,j) are consumed to regenerate a quantum key between the pair of random nodes (i,j), node n and node m may be stored for the regenerated quantum key (i,j) as information relating to a quantum key consumption path.

When data using quantum key (i,j) occurs, the data may be transferred through a routing algorithm in a network topology excluding node n and node m with reference to a quantum key consumption path.

Thereafter, the data transmitter 150 removes information related to the quantum key qi,j used as a service key for data encryption, from the quantum key information table R.

In an embodiment of the present disclosure, through the above scheme, a quantum key consumption path and a data path using the corresponding quantum key may be configured to be physically mutually exclusive.

Therefore, even in a case wherein an eavesdropper exists and eavesdrops in a network path, a threat of exposing both a quantum key and data may be minimized.

In the above description, a case where a quantum key consumption path and a data transfer path are mutually exclusive disjoint sets has been given as an example, but a scope of an embodiment of the present disclosure is not limited thereto.

For example, when a data transfer path is calculated, a method of exceptionally allowing overlapping of links, the number of which is equal to or smaller than a fourth threshold (Thr 4), in a quantum key consumption path used to encrypt corresponding data may be considered.

In addition, when a data transfer path is calculated, a method of exceptionally allowing overlapping of nodes, the number of which is equal to or smaller than a fifth threshold (Thr 5), in a quantum key consumption path used to encrypt corresponding data may also be considered.

It is possible to flexibly configure each of the fourth and fifth thresholds by collectively considering a required network security level, the number of network paths, and a network scale.

As discussed above, according to the configuration of the quantum key distribution network apparatus 100 according to an embodiment of the present disclosure, independent configurations of a quantum key consumption path and a data transfer path enable configuration of optimal paths suitable for respective purposes, whereby improvement of network performance in quantum encryption communication can be accomplished. Moreover, network sharing between a quantum key consumption path and a data transfer path may be minimized to reduce the risk of exposure of both a quantum key and data even with existence of an eavesdropper, whereby security improvement effects can be expected.

Figure 3:
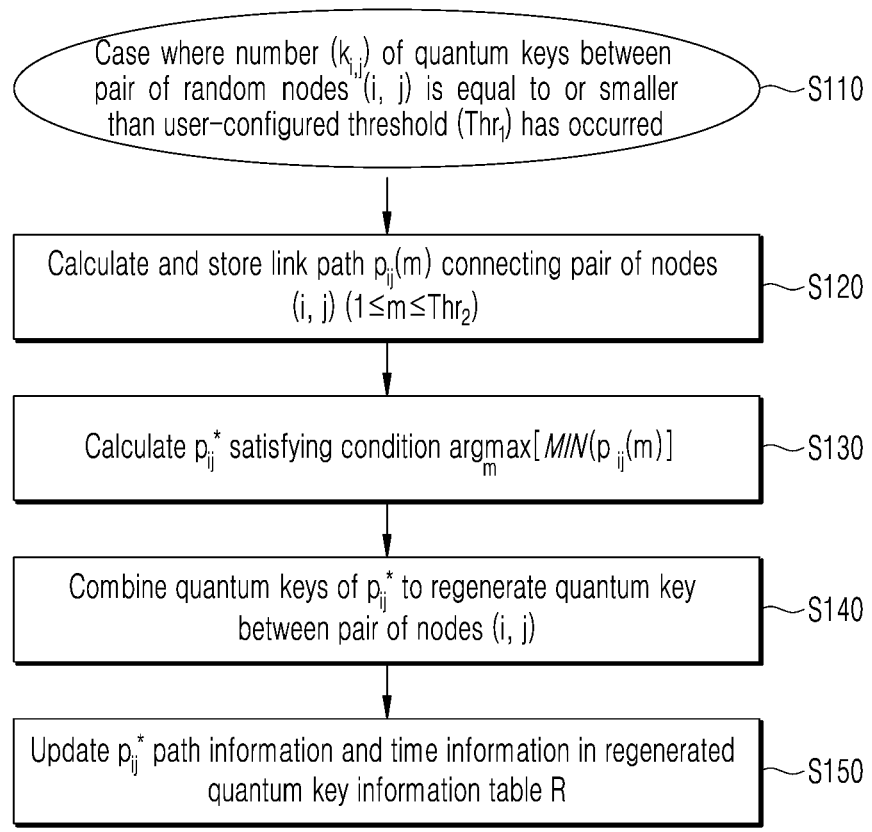
FIG. 3 is a flowchart illustrating an operation flow of regenerating a quantum key in an operation method for a quantum key distribution network according to an embodiment of the present disclosure.
Figure 4:
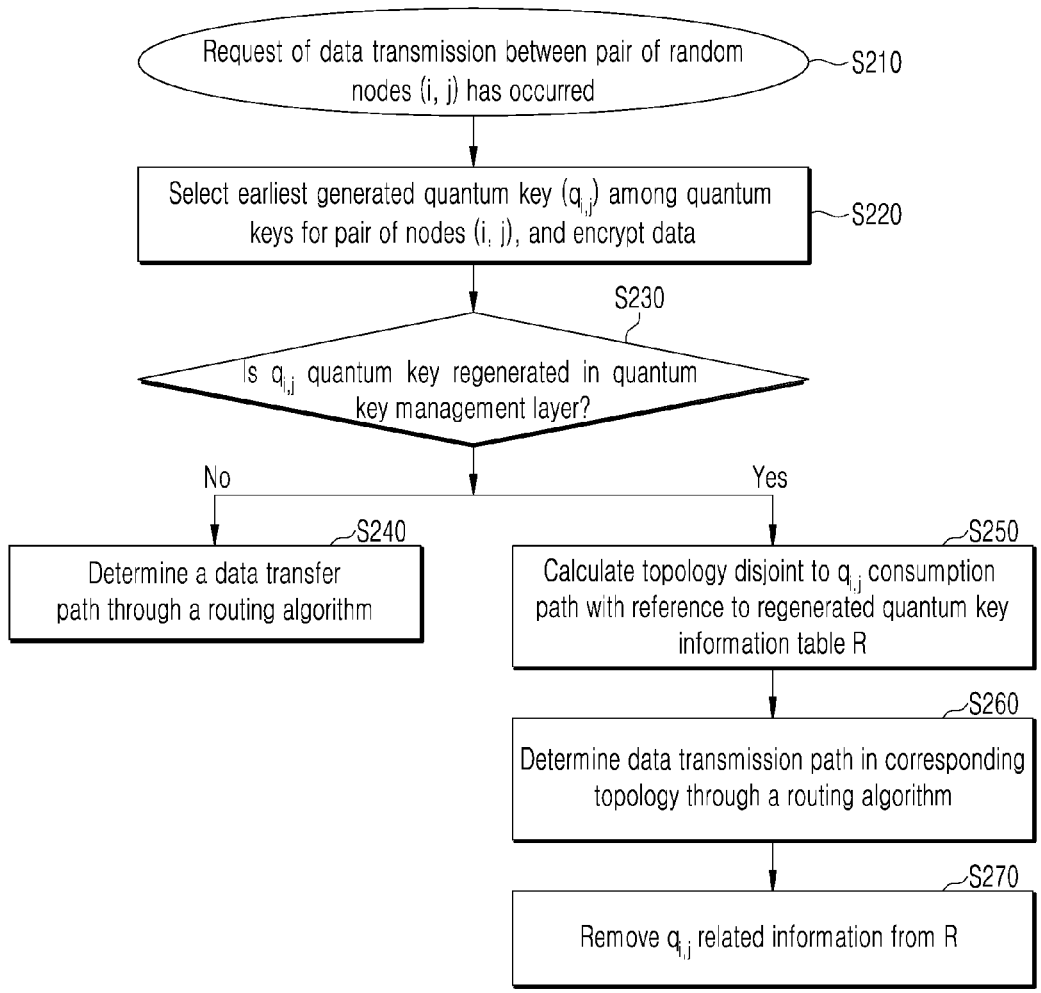
FIG. 4 is a flowchart illustrating an operation flow of transmitting data in an operation method for a quantum key distribution network according to an embodiment of the present disclosure.

Hereinafter, an operation method for a quantum key distribution network according to an embodiment of the present disclosure will be described with reference to FIG. 3 and FIG. 4.

An entity performing an operation method for a quantum key distribution network according to an embodiment of the present disclosure is the quantum key distribution network apparatus 100, and thus a description will be given with reference to the reference numerals in FIG. 3 described above.

First, an operation flow of regenerating a quantum key in the operation method for a quantum key distribution network will be described with reference to FIG. 3.

First of all, the quantum key combiner 120 may regenerate a quantum key in a scheme of combining quantum keys received from the quantum key distribution layer, when a particular condition is satisfied.

The particular condition may be irrelevant to data generation, and the combination of quantum keys may be understood as a process of consuming multiple quantum keys to regenerate one quantum key.

In the structure given above as an example in FIG. 1, in a case where combination of quantum keys is applied, a quantumkey1,3 may be generated by combining a quantum key1,2 and a quantum key2,3.

In relation thereto, the quantum key combiner 120 may combine quantum keys, among quantum keys distributed between pairs of adjacent nodes, in a link path connecting a pair of random nodes so as to regenerate a quantum key between the pair of random nodes.

When the number (ki,j) of quantum keys of a pair of random nodes (i, j E N) among quantum keys stored in the quantum key management layer with respect to a network node set N is equal to or smaller than a first threshold (Thr1) configured by a user, the quantum key combiner 120 may combine quantum keys in the quantum key management layer to regenerate a quantum key for the corresponding pair of nodes (i,j) (S110).

The first threshold is possible to be flexibly configured according to each of a network environment and a user data generation pattern.

For the regeneration of a quantum key, as described above, a method of combining multiple quantum keys sharing a network node may be considered.

For example, a quantum keya,b between node a and node b, and a quantum keyb,c between node b and node c may be consumed to regenerate a quantum keya,c between node a and node c.

That is, the regeneration of a quantum key for the pair of nodes (i,j) may be accomplished by combining quantum keys in a path pij that is a set of links connecting node i and node j in a network topology.

Ina general network topology, there may be multiple paths connecting two random nodes.

Therefore, the quantum key combiner 120 calculates and stores the total number of link paths connecting the pair of nodes (i,j) by a second threshold (Thr2).

When the second threshold becomes greater, more link paths are searched for. Therefore, it may be advantageous for selection of an optimal path, but a very long calculation time is required when a network scale gets larger.

Therefore, the second threshold may be flexibly selected according to a network scale and a computing performance.

In an embodiment of the present disclosure, a m-th path connecting the pair of nodes (i,j) is defined as pij(m).

In relation thereto, the quantum key combiner 120 may calculate an optimal quantum key consumption path through [Equation 1] described above, and define a result of the calculation as pij* (S120-S140).

That is, the quantum key combiner (120) may combine (consume) quantum keys of pij* in which a link has the largest minimum number of quantum keys, among link paths connecting the pair of nodes (i,j), to regenerate a quantum key between the pair of nodes (i,j).

Thereafter, when a quantum key between the pair of nodes (i,j) is regenerated, the quantum key information storage unit 130 may update and store pij* path information (quantum key consumption path) and information of a time at which the quantum key is regenerated, in a table R in which information of regenerated quantum keys is stored (S150).

For reference, the quantum key information storage unit 130 may configure a third threshold (Thr3) for a life cycle of a quantum key and discard a quantum key which has not been used for a time longer than a life cycle, so as to support security improvement.

The third threshold may also be flexibly configured in consideration of a quantum key generation speed, a quantum key consumption speed, and a recommended value to satisfy the security criteria.

Next, an operation flow of transmitting data in the operation method for a quantum key distribution network will be described with reference to FIG. 4.

First, when data transmission between a pair of random nodes is required, the data encrypter 140 selects a quantum key between the pair of random nodes as a service key and encrypts data (S210-S220).

When a request of data transmission between the pair of random nodes (i,j) occurs, the data encrypter 140 requests a service key for encryption of corresponding data from the quantum key management layer.

In relation thereto, the quantum key management layer selects the earliest generated quantum key (qi,j) among quantum keys for the corresponding pair of nodes and provides same as a service key, and the service layer encrypts data by using the quantum key.

Thereafter, the data transmitter 150 transmits, according to a request of data transmission between the pair of random nodes, the encrypted data through a data transmission path, at least a partial path of which does not overlap with a quantum key consumption path in which a quantum key has been consumed for regeneration of a quantum key, among link paths connecting the pair of random nodes.

In relation thereto, the quantum key qi,j, which is selected as a service key for data encryption in the above example, may be a quantum key directly generated in the quantum key distribution layer, or may be a quantum key regenerated in the quantum key management layer.

If the quantum key qi,j, which is selected as a service key, is a quantum key directly generated in the quantum key distribution layer, the data transmitter 150 transfers the encrypted data through a routing algorithm (S230-S240).

To this end, a routing algorithm, such as an open-shortest path first (OSPF), may be applied, but an embodiment of the present disclosure is not limited thereto.

When the quantum key qi,j, which is selected as a service key, is determined to be a quantum key regenerated in the quantum key management layer in operation S230, the data transmitter 150 calculates a path, as a data transfer path, which is a disjoint set for a quantum key consumption path (S250).

To this end, the data transmitter 150 acquires path information (quantum key consumption path) on a quantum key which has been consumed for regeneration of qi,j, with reference to a regenerated quantum key information table R.

Furthermore, the data transmitter 150 excludes a quantum key consumption path for encryption of the corresponding data from a network topology, and then calculates a data transmission path for transmission of the encrypted data through a routing algorithm (S260).

For example, when quantum keys of link (i,n), link (n,m), and link (m,j) are consumed to regenerate a quantum key between a pair of random nodes (i,j), link (i,n), link (n,m), and link (m,j) may be stored for the regenerated quantum key (i,j) as information relating to a quantum key consumption path. In the above example, link (i,n) may be defined as a physical link connecting node i and neighboring node n.

When data using quantum key (i,j) occurs, the data may be transferred through a routing algorithm in a network topology excluding link (i,n), link (n,m), and link (m,j) with reference to a quantum key consumption path.

In addition, in operation S260, when excluding the quantum key consumption path for the corresponding data from a network topology, the data transmitter 150 may calculate a data transmission path for transmission of the encrypted data through a routing algorithm by using network node information.

For example, when quantum keys of link (i,n), link (n,m), and link (m,j) are consumed to regenerate a quantum key between the pair of random nodes (i,j), node n and node m may be stored for the regenerated quantum key (i,j) as information relating to a quantum key consumption path.

When data using quantum key (i,j) occurs, the data may be transferred through a routing algorithm in a network topology excluding node n and node m with reference to a quantum key consumption path.

Thereafter, the data transmitter 150 removes information related to the quantum key qi,j used as a service key for data encryption, from the quantum key information table R (S270).

In an embodiment of the present disclosure, through the above scheme, a quantum key consumption path and a data path using the corresponding quantum key may be configured to be physically mutually exclusive.

Therefore, even in a case wherein an eavesdropper exists and eavesdrops in a network path, a threat of exposing both a quantum key and data may be minimized.

In the above description, a case where a quantum key consumption path and a data transfer path are mutually exclusive disjoint sets has been given as an example, but a scope of an embodiment of the present disclosure is not limited thereto.

For example, when a data transfer path is calculated, a method of exceptionally allowing overlapping of links, the number of which is equal to or smaller than a fourth threshold (Thr 4), in a quantum key consumption path used to encrypt corresponding data may be considered.

In addition, when a data transfer path is calculated, a method of exceptionally allowing overlapping of nodes, the number of which is equal to or smaller than a fifth threshold (Thr 5), in a quantum key consumption path used to encrypt corresponding data may also be considered.

It is possible to flexibly configure the fourth and fifth thresholds by collectively considering a required network security level, the number of network paths, and a network scale.

As discussed above, according to an operation method for a quantum key distribution network according to an embodiment of the present disclosure, independent configurations of a quantum key consumption path and a data transfer path enable configuration of optimal paths suitable for respective purposes, whereby improvement of network performance in quantum encryption communication can be accomplished. Moreover, network sharing between a quantum key consumption path and a data transfer path may be minimized to reduce the risk of exposure of both a quantum key and data even with existence of an eavesdropper, whereby security improvement effects can be expected.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a stand-alone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

What is claimed is:

1. A quantum key distribution network apparatus comprising:
    a non-transitory computer readable medium to store instructions; and
    a processor that executes one or more of the instructions to:
        receive a quantum key distributed between a pair of adjacent nodes in a quantum key distribution network;
        combine quantum keys in a path connecting a pair of random nodes among quantum keys distributed between pairs of adjacent nodes, to regenerate a quantum key between the pair of random nodes; and
        transmit encrypted data through a data transmission path of link paths connecting the pair of random nodes,
    wherein the processor is configured to calculate, as the data transmission path, one of:
        a link path of link paths connecting the pair of random nodes and which is a disjoint set for a quantum key consumption path, or
        a node path of node paths connecting the pair of random nodes and which is a disjoint set for the quantum key consumption path,
    wherein the processor is configured to, when the data transmission path is calculated as the link path of link paths connecting the pair of random nodes, exceptionally allow overlapping of links in the quantum key consumption path, a number of which is equal to or smaller than a pre-configured threshold number of links, and
    wherein the processor is configured to, when the data transmission path is calculated as the node path of node paths connecting the pair of random nodes, exceptionally allow overlapping of nodes in the quantum key consumption path, a number of which is equal to or less than a less than a pre-configured threshold number of nodes.

2. The quantum key distribution network apparatus of claim 1, wherein the processor is configured to regenerate a quantum key between the pair of random nodes, when a number of quantum keys allocated between the pair of random nodes is equal to or smaller than a pre-configured first threshold.

3. The quantum key distribution network apparatus of claim 1, wherein the processor is configured to, when a number of link paths connecting the pair of random nodes is two or more, combine quantum keys in a particular link path of the two or more link paths, which has a largest minimum number of quantum keys among the two or more link paths, so as to regenerate the quantum key.

4. The quantum key distribution network apparatus of claim 1, wherein the processor is configured to, when there are two or more link paths connecting the pair of random nodes, calculate the link paths, a number of which is equal to or smaller than a pre-configured second threshold.

5. The quantum key distribution network apparatus of claim 1, wherein the processing is further configured to:
    when a quantum key between the pair of random nodes is regenerated, store at least one of the quantum key consumption path in which a quantum key has been consumed for the regeneration of the quantum key, and a time at which the quantum key is regenerated, and
    discard a quantum key not used until a time greater than or equal to a pre-configured third threshold from a time of regeneration.

6. An operation method for a quantum key distribution network, which is performed in a quantum key distribution network apparatus, the method comprising:
- receiving a quantum key distributed between a pair of adjacent nodes in a quantum key distribution network;
- combining quantum keys in a path connecting a pair of random nodes among quantum keys distributed between pairs of adjacent nodes, to regenerate a quantum key between the pair of random nodes; and
- transmitting encrypted data through a data transmission path of link paths connecting the pair of random nodes, at least a partial path of which does not overlap with a quantum key consumption path in which a quantum key has been consumed for regeneration of a quantum key,
- wherein the pair of random nodes are connected by two or more linked paths, and combining the quantum keys includes combining quantum keys from a particular link path, of the two or more link paths, having a largest minimum number of quantum keys among the two or more link paths,
- wherein transmitting the encrypted data comprises:
  - calculating, as the data transmission path, one of:
    - a link path of link paths connecting the pair of random nodes, which is a disjoint set for the quantum key consumption path, or
    - a node path of node paths connecting the pair of random nodes. which is a disjoint set for the quantum key consumption path,
    - when the data transmission path is calculated as the link path of link paths connecting the pair of random nodes, exceptionally allowing overlapping of links in the quantum key consumption path, a number of which is equal to or smaller than a pre-configured threshold number of links; and
    - when the data transmission path is calculated as node path of node paths connecting the pair of random nodes, exceptionally allowing overlapping of nodes in the quantum key consumption path, number of which is equal to or smaller than a pre-configured threshold number of nodes.

7. The method of claim 6, wherein combining the quantum keys comprises regenerating a quantum key between the pair of random nodes when a number of quantum keys allocated between the pair of random nodes is equal to or smaller than a pre-configured first threshold.

8. The method of claim 6, wherein combining the quantum keys comprises calculating the two or more link paths, number of which is equal to or smaller than a pre-configured second threshold.

9. The method of claim 6, further comprising:
- when a quantum key between the pair of random nodes is regenerated, storing at least one of the quantum key consumption path in which a quantum key has been consumed for the regeneration of the quantum key, and a time at which the quantum key is regenerated and
- discarding a quantum key not used until a time greater than or equal to a pre-configured third threshold from a time of regeneration.

* * * * *